US011823233B2

(12) United States Patent
Williams et al.

(10) Patent No.: US 11,823,233 B2
(45) Date of Patent: *Nov. 21, 2023

(54) REAL-TIME CONSUMER INTERACTION VIA MEDIA BROADCAST WITH AUTOMATED CALLBACK HANDLING DURING MEDIA PLAYBACK

(71) Applicant: Virtual Hold Technology Solutions, LLC, Akron, OH (US)

(72) Inventors: Mark J. Williams, North Canton, OH (US); Daniel Bohannon, Livermore, CA (US)

(73) Assignee: Virtual Hold Technology Solutions, LLC, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,723

(22) Filed: Jan. 10, 2023

(65) Prior Publication Data

US 2023/0134105 A1  May 4, 2023

Related U.S. Application Data

(63) Continuation-in-part of application No. 17/573,573, filed on Jan. 11, 2022, now Pat. No. 11,551,266, (Continued)

(51) Int. Cl.
*G06Q 30/00* (2023.01)
*G06Q 30/0251* (2023.01)
(Continued)

(52) U.S. Cl.
CPC ..... *G06Q 30/0267* (2013.01); *G06Q 30/0241* (2013.01); *H04N 21/431* (2013.01);
(Continued)

(58) Field of Classification Search
CPC ....................... G06Q 30/0267; G06Q 30/0241
See application file for complete search history.

(56) References Cited

U.S. PATENT DOCUMENTS

| | | | | |
|---|---|---|---|---|
| 8,893,180 B2* | 11/2014 | Barton | ................. | H04N 21/437 |
| | | | | 725/40 |
| 2005/0165686 A1* | 7/2005 | Zack | .................. | G06Q 30/0617 |
| | | | | 705/51 |

(Continued)

OTHER PUBLICATIONS

C. Hesselman et al., "Sharing enriched multimedia experiences across heterogeneous network infrastructures," in IEEE Communications Magazine, vol. 48, No. 6, pp. 54-65, Jun. 2010, doi: 10.1109/MCOM.2010.5473865. (Year: 2010).*

(Continued)

*Primary Examiner* — Sun M Li

(57) ABSTRACT

A system for integrated consumer interaction via media broadcast utilizing automated callback handling during media playback, comprising an immediate communication system that communicates with a media provider and a communications system, wherein the consumer submits a request to a content provider for interaction that is then handled by the immediate communication to establish an interaction with a communication system, and a method for providing integrated consumer interaction. Additionally, the components of the system can be configured to support automated callback handling during media content playback for incoming requests such as incoming calls, texts, and emails.

16 Claims, 8 Drawing Sheets

Related U.S. Application Data which is a continuation of application No. 17/014,889, filed on Sep. 8, 2020, now Pat. No. 11,232,487, which is a continuation of application No. 14/247,251, filed on Apr. 8, 2014, now Pat. No. 10,769,668.

(51) Int. Cl.
    *G06Q 30/0241*      (2023.01)
    *H04N 21/431*      (2011.01)
    *H04N 21/478*      (2011.01)
    *H04N 21/81*      (2011.01)
    *H04N 21/84*      (2011.01)
    *H04N 21/8545*      (2011.01)

(52) U.S. Cl.
    CPC ..... *H04N 21/47815* (2013.01); *H04N 21/812* (2013.01); *H04N 21/84* (2013.01); *H04N 21/8545* (2013.01)

(56) References Cited

U.S. PATENT DOCUMENTS

| | | | |
|---|---|---|---|
| 2008/0066127 A1* | 3/2008 | Schechinger | H04N 21/4722 348/E7.071 |
| 2010/0023959 A1* | 1/2010 | Bugenhagen | H04N 21/254 725/105 |
| 2012/0288075 A1* | 11/2012 | Williams | H04M 3/5232 379/201.02 |
| 2012/0304207 A1* | 11/2012 | Hughes | H04H 60/31 725/14 |
| 2013/0054684 A1* | 2/2013 | Brazier | H04M 3/5231 709/203 |
| 2021/0289261 A1 | 9/2021 | Sharma et al. | |

OTHER PUBLICATIONS

Community-based applications, by E. Marilly, C. Senot, X. Andrieu, B. Boidart, A. Aghasaryan and A. Germaneau, in Bell Labs Technical Journal, vol. 15, No. 4, pp. 93-109, Mar. 2011, doi: 10.1002/bltj.20474. (Year: 2011).*

S. Venkatesh et al., ""You Tube and I Find"—Personalizing Multimedia Content Access," in Proceedings of the IEEE, vol. 96, No. 4, pp. 697-711, Apr. 2008, doi: 10.1109/JPROC.2008.916378. (Year: 2008).*

E. Bonilla, M. Stier, S. Niccolini and M. Brunner, "Automated Real-Time Recommendations for IPTV," 2009 IEEE International Conference on Communications, Dresden, Germany, 2009, pp. 1-6, doi: 10.1109/ICC.2009.5305951. (Year: 2009).*

* cited by examiner

REAL-TIME CONSUMER INTERACTION VIA MEDIA BROADCAST WITH AUTOMATED CALLBACK HANDLING DURING MEDIA PLAYBACK

CROSS-REFERENCE TO RELATED APPLICATIONS

Priority is claimed in the application data sheet to the following patents or patent applications, each of which is expressly incorporated herein by reference in its entirety:
Ser. No. 17/573,573
Ser. No. 17/014,889
Ser. No. 14/247,251

BACKGROUND

Field of the Invention

The invention relates to the field of consumer advertising and interaction, and more particularly to the field of interacting with a consumer through a media broadcast.

Discussion of the State of the Art

Almost every company today spends a great deal of money on marketing and advertising. Some forms of advertising are relatively cheap, while other forms of advertising, live TV commercials, are very expensive—especially during prime viewing hours or during special events. The goal of TV advertising is really focused around two primary objectives.

One objective is to reinforce the company's brand and awareness in the market to ensure that when a consumer or company may need that product/service they think of them first. This type of focused TV advertising is usually utilized by the major consumer product companies, like BUDWEISER™, PEPSI™, and others. Their goal to make sure that the next time a consumer is going to purchase a product they provide, that their brand is chosen over the competition.

Another objective for investing in expensive TV advertising is to excite and motivate the consumer to do something "now". This is referred to as "call to action" marketing, and Companies that invest in this type of TV advertising usually display a toll free number on the screen, repeat the number multiple times throughout the commercial, and try to prompt the consumer to pick up the phone and call. Companies that use this type of advertising strategy will look to show their commercial during a type of show (drama, comedy, miniseries, sports events . . . ), and during times that fit the demographics of the type of consumer they are marketing. They also realize that the greatest consumer response to the commercial will happen during, or shortly after the commercial airs—after that, the consumer will usually forget, get distracted, or lose interest in purchasing the product.

Investing in live TV advertising has been the steadfast form of marketing for companies to get their company/brand in front of existing and potential customers. Since most companies are targeting similar consumer profile types, the prime viewing hours are so expensive that usually only the major brands can afford competing for advertising slots made available by the broadcasters. This makes live TV commercials one of the most expensive forms of advertising/marketing that a company will invest in, and in the case of "call to action" advertising the company will see very little return on their investment unless the consumer watching the commercial immediately contacts them.

The easier a company can make it for a consumer to get in contact with the company, the more likely it is that they (the consumer) will do what the company is trying to accomplish with the commercial—which is to contact the company. Providing a toll-free telephone contact number takes away any potential toll cost to the consumer associated with calling the company, but it really doesn't make it easier for them and today toll free numbers are viewed as "expected" by consumers. However, calling a company can be viewed by consumers as aggravating, because they have to typically get up from the couch/chair, write down or remember the number, and then grab the phone and dial, and then they know that the call will be answered by an automated system asking them to enter/press numbers. This can be a major deterrent for the consumer to act on their initial reaction to call the company after viewing a commercial. This means that companies are not realizing the full return on their TV advertising investment simply because it is perceived by the consumers as too much effort.

What is needed is a means to integrate consumer contact or interaction with the media broadcasts that contain advertisements intended to target them—thereby alleviating any perceived inconvenience caused by the contact, and expediting the interaction process.

SUMMARY OF THE INVENTION

Accordingly, the inventor has conceived and reduced to practice, in a preferred embodiment of the invention, a system and method for integrating contact queuing methodologies and systems into network broadcasting advertising and programming systems that are linked with the advertising companies' sales and service resources, and that may utilize and integrate with the readily available consumer based receiver hardware (such as a remote, "smart" device, and cable/TV box). Such a system can provide automated callback handling during media playback on a consumer device for incoming requests such as incoming calls, texts, and emails.

According to a preferred embodiment of the invention, a system for integrated consumer interaction with automated callback handling during media playback is disclosed, comprising: a media player application installed on a consumer device, the media player application comprising a first plurality of programming instruction stored in a memory of, and operating on a processor of, the consumer device, wherein the first plurality of programming instructions, when operating on the processor of the consumer device, cause the consumer device to: request, receive, and store contact and preference information from a user; receive media content from a content provider; play the media content on the consumer device; while the media content is playing, display an interactive interface element within a graphical user interface operating on the user's consumer device; and upon receipt of a user command via the interactive interface element: automatically retrieve real-time consumer context data comprising at least location, activity, and language preference data from the consumer device based on the media content being played, its associated metadata and the current local time on the consumer device; automatically generate an electronic callback; and automatically send the callback request to an integrated communications server; and the integrated communication server comprising a memory, a processor, and a second plurality of programmable instructions stored in the memory of, and operating on the processor of, the integrated communication server, wherein the second plurality of programming instructions, when operating on the processor of the integrated communication server, cause the integrated communication server to: receive the company contact information, the media content identification, and the user's contact and preference information; receive a callback request from the consumer device; automatically schedule a callback to the user of the consumer device based at least on the metadata specific to media content being played on the user device and on the received contact and preference information; and when scheduled, automatically place a telephone call to the consumer device and to a call center agent appropriately skilled to handle the specific callback request.

According to another preferred embodiment, a method for integrated consumer interaction with automated callback handling during media playback is disclosed, comprising the steps of: configuring a media player application to perform the following steps when installed on a consumer device: requesting, receiving, and storing contact and preference information from a user; receiving media content from a content provider; playing the media content on the consumer device; while the media content is playing, displaying an interactive interface element within a graphical user interface operating on the user's consumer device; upon receipt of a user command via the interactive interface element: automatically retrieving real-time consumer context data comprising at least location, activity, and language preference data from the consumer device based on the media content being played, its associated metadata and the current local time on the consumer device; automatically generating an electronic callback; and automatically sending the callback request to an integrated communication server comprising a memory, a processor, and a plurality of programming instructions stored in the memory and operating on the processor; using the integrated communication server to perform the following steps: receiving the company contact information, the media content identification, and the user's contact and preference information; receiving a callback request from the consumer device; automatically scheduling a callback to the user of the consumer device based at least on the metadata specific to media content being played on the user device and on the received contact and preference information; and when scheduled, automatically placing a telephone call to the consumer device and to a call center agent appropriately skilled to handle the specific callback request.

According to an aspect of an embodiment, the media player application is further configured to: while the media content is playing: receive an incoming request from a second user, wherein the incoming request is an incoming call, text, email, or voicemail; retrieve consumer information and information associated with incoming request; and send the consumer information and the information associated with the incoming request to the integrated communication server.

According to an aspect of an embodiment, the integrated communication server is further configured to: receive the consumer information and the information associated with the incoming request; use the consumer information to identify a consumer profile in a database, wherein the consumer information comprises a unique identifier which is used to match against a stored unique identifier in the consumer profile; retrieve consumer callback preference information from the identified consumer profile; automatically schedule a callback between the user of the consumer device and the second user based at least on the consumer callback preference information; and when scheduled, automatically place a telephone call to the consumer device and to the second user.

According to an aspect of an embodiment, the consumer callback preference information further comprises configuration settings for handling incoming requests while the media content is being played According to an aspect of an embodiment, the configuration settings comprise user-specific preferences, group-based preferences, playback-based preferences, schedule-based preferences, group based preferences, media-based preferences, and communication channel specific preferences.

According to an aspect of an embodiment, the telephone call to the consumer device and to a call center agent establishes a two-way voice connection between the user of the consumer device and a selected call center agent.

According to an aspect of an embodiment, the telephone call to the consumer device and the to the second user establishes a two-way voice connection between the user of the consumer device and the second user.

According to an aspect of an embodiment, the consumer callback preference information is stored in a data storage operating as a component of the integrated communication server.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
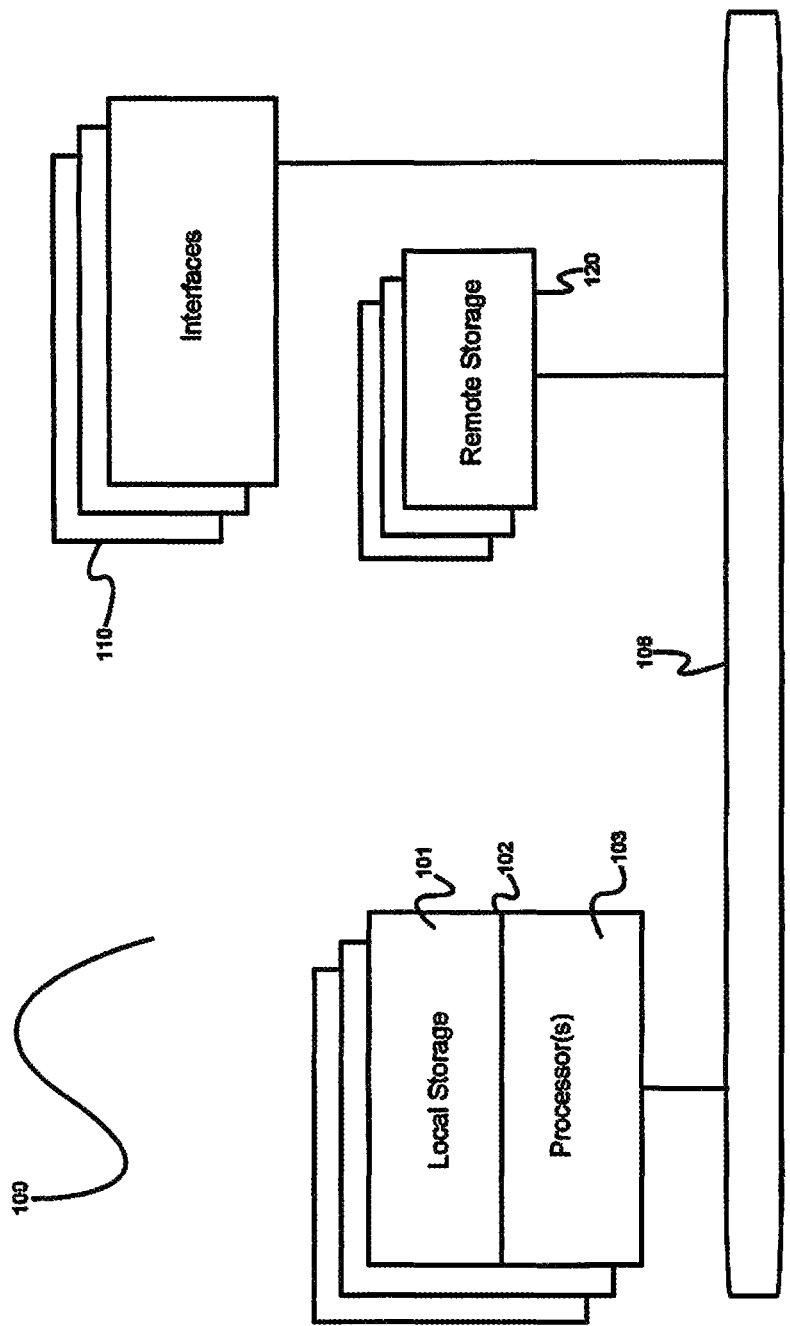
FIG. 1 is a block diagram illustrating an exemplary hardware architecture of a computing device used in an embodiment of the invention.

The inventor has conceived, and reduced to practice, a system and method for integrated consumer contact via media broadcasts with automated callback handling during media playback.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

A "consumer", as used herein, may be any person or party that may view or otherwise consume media. For example, a consumer may be an individual viewing a television commercial, or a computer user listening to an audio recording over the Internet, or any other appropriate media consumption.

A "provider", as used herein, may be any party that may present media for viewing or consumption by consumers. For example, a provider may be a company providing advertisements via television or other broadcasts, or an individual providing content for viewing over the Internet (such as a video on YOUTUBE™ or other hosting service), or a hosting service providing media on behalf of media creators (such as YOUTUBE™ itself, providing user-uploaded media content).

"Callback object" as used herein means a data object representing callback data, such as the identities and call information for a first and second user, the parameters for a callback including what time it shall be performed, and any other relevant data for a callback to be completed based on the data held by the callback object.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some in stances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
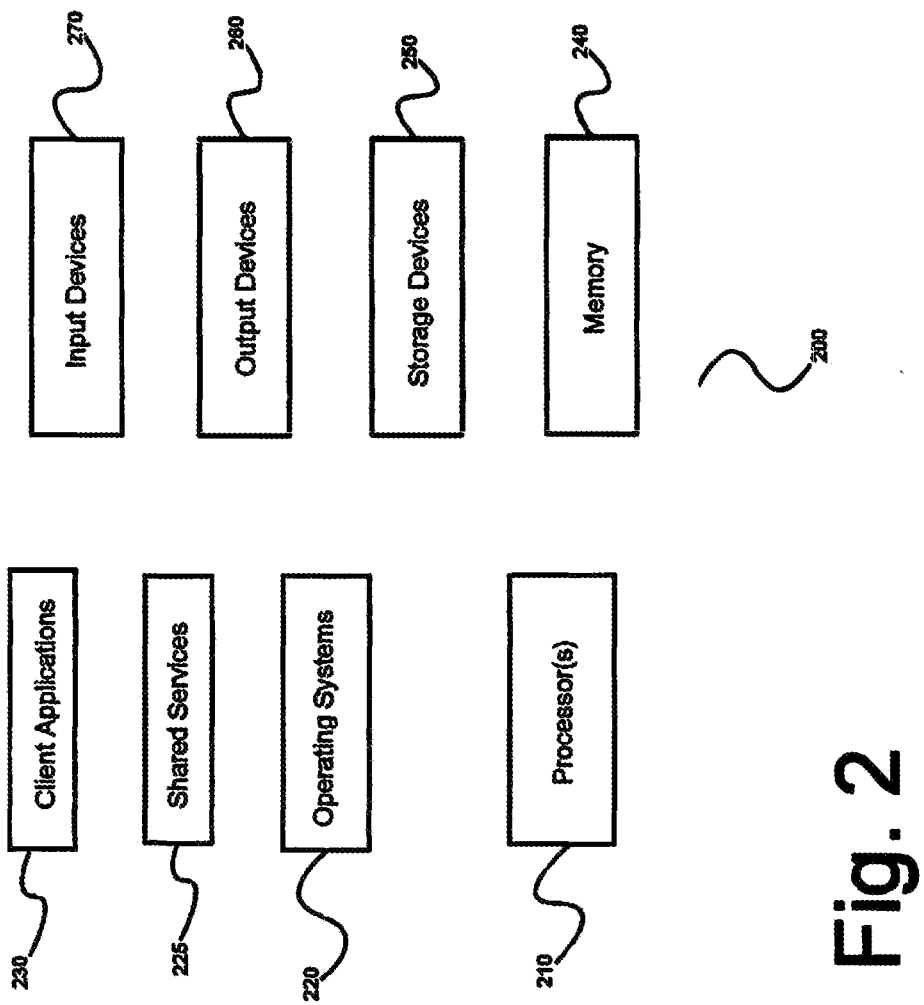
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to a system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
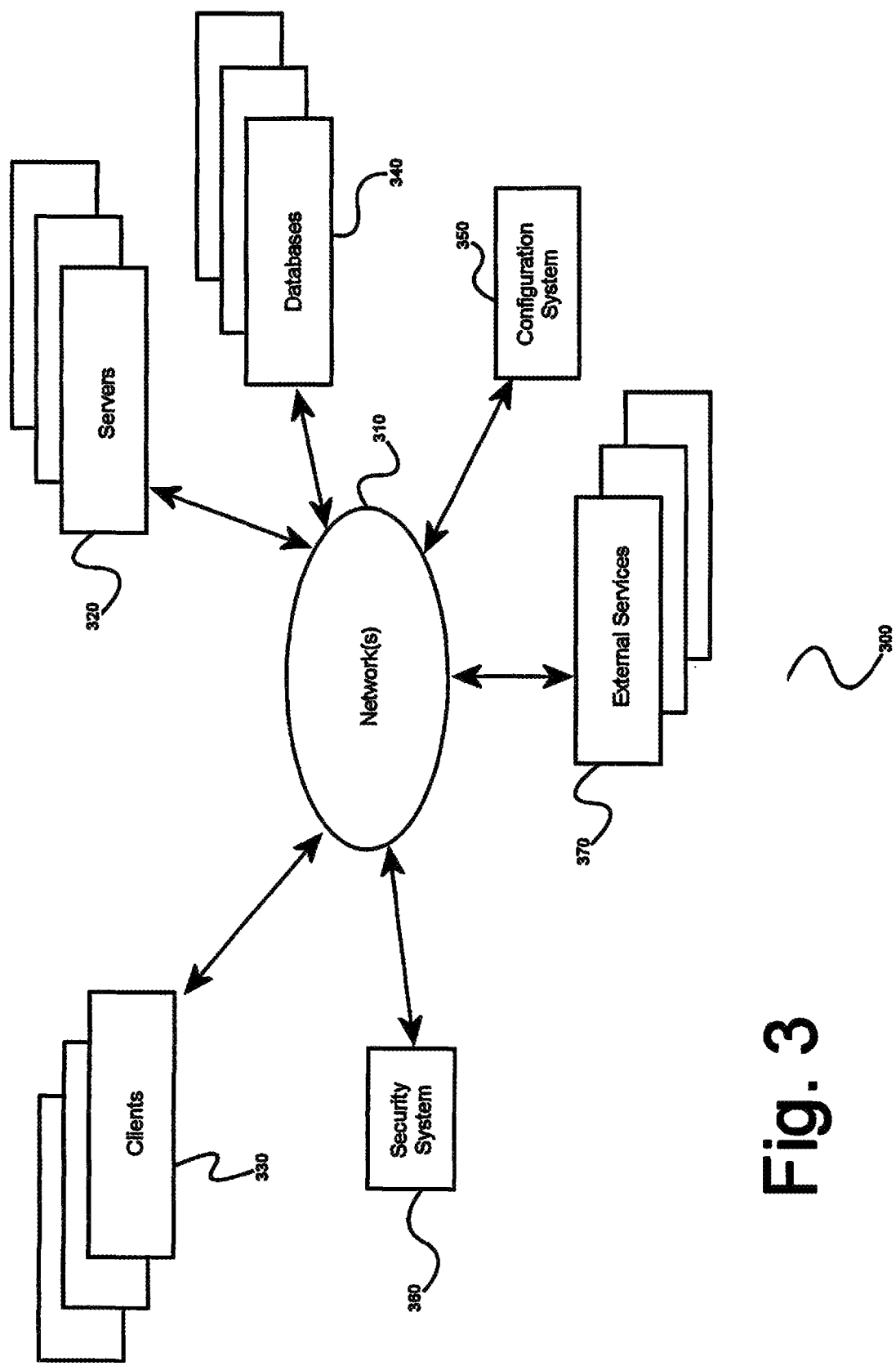
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network 300. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
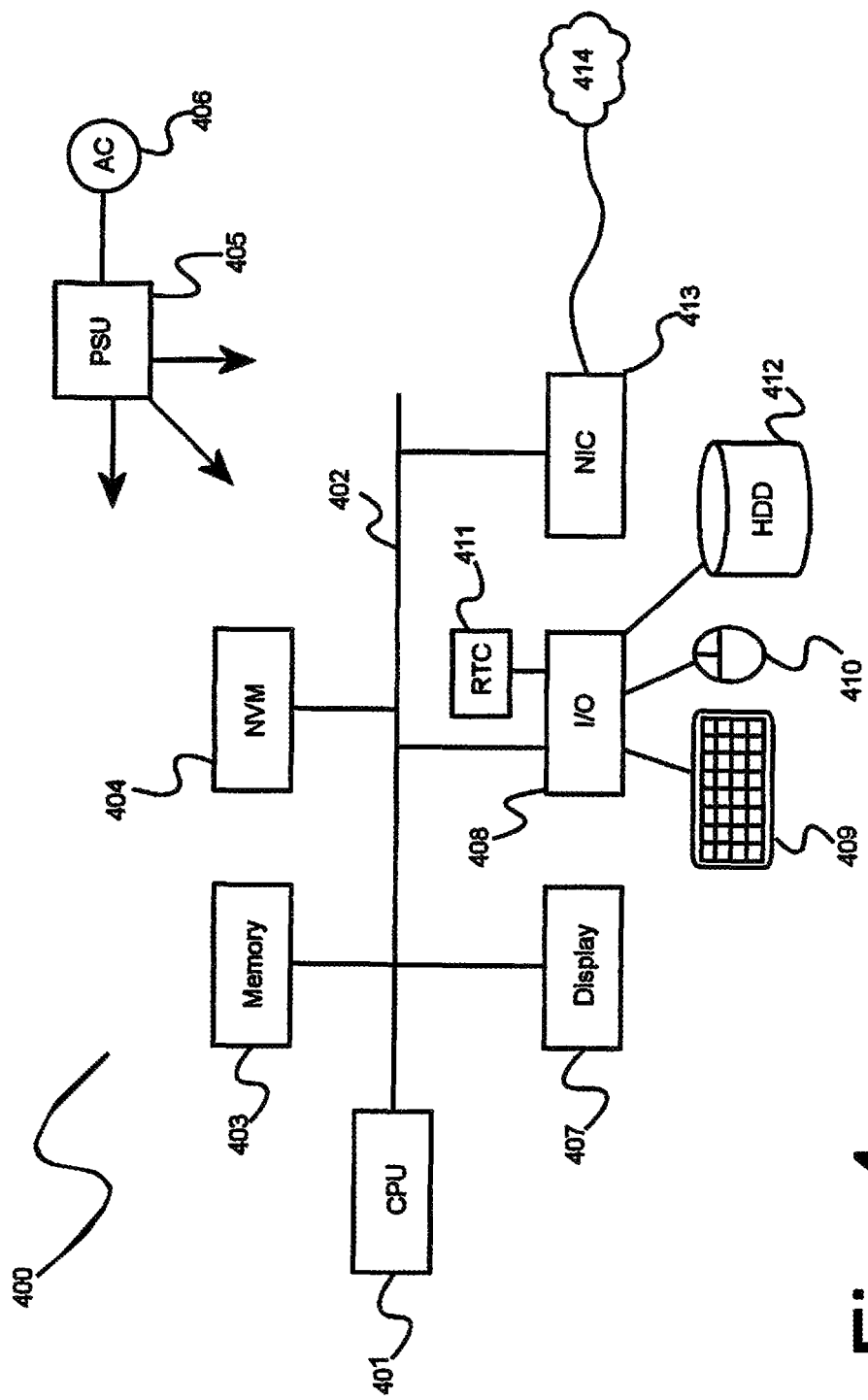
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
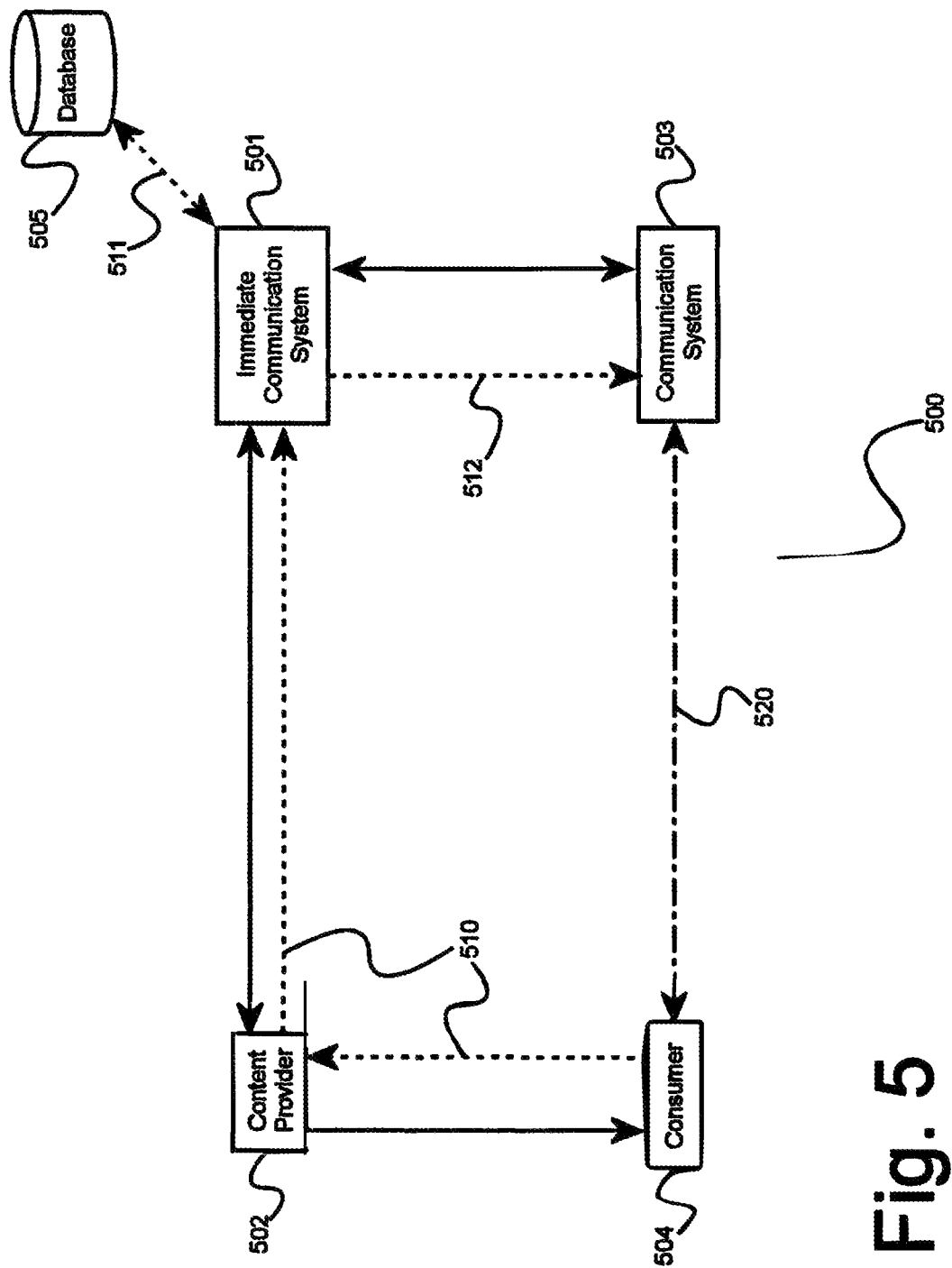
FIG. 5 is a system architecture diagram illustrating an exemplary system for consumer contact integration with media broadcasts, according to a preferred embodiment of the invention.

FIG. 5 is a block diagram of an exemplary system architecture 500 for providing integrated consumer interaction via media broadcasts, according to a preferred embodiment of the invention. As illustrated, a system 500 may comprise an immediate communication system (ICS) 501, that may be any suitable hardware or software component such as a software application operating on a computing device such as a server, or may be a software app operating on a consumer's personal device such as a smartphone or any other device suitable for media consumption or communication. In this manner, it can be appreciated that the functions of an ICS (as described below) may be provided as a service that may add function to existing media consumption (such as by operating on the "backend", adding function to services provided to consumer devices without any modification of those devices or even the consumer's knowledge), or may be provided as a dedicated solution such as a software app that consumers may choose to install on their device, such that they may choose when to utilize the additional functions provided (such as by viewing media through an integrated media consumption and communications app, rather than using an integrated approach with existing media consumption solutions).

As illustrated, an ICS 501 may engage in two-way communications with content providers 502 and communication systems 503 such as contact centers or personal contact means (such as an email or cellular communications provider), and may also be connected to a database 505 (that may be any suitable data storage means, such as physical storage devices or software-based data storage means as are common in the art). As further illustrated, content providers 502 may present media to consumers 504 for viewing, such as providing broadcasts of audio, video, or other media content for consumption. It should be appreciated that all connections shown may vary in nature such as being remote connections via the Internet or similar data communications network, or may be direct connections such as systems operating on a local area network (LAN) via wireless or direct physical connections interchangeably, and that such connections are shown in an abbreviated form for the sake of illustration clarity.

Consumers may be able to send requests 510 to content providers, such as to request communication with parties relevant to media being viewed (such as requesting to contact a company while viewing an advertisement about a product or service they offer). These requests may be passed to an ICS, optionally with additional information that may be relevant to a request (such as information regarding a consumer's locale or device information), for handling. Additionally, an ICS 501 may communicate with a database 505, such as to retrieve 511 information that may be relevant to request handling (such as previously-established consumer information, for example communication preferences or other information that may be relevant to interactions or their handling). An ICS may then communicate 512 with a communication system 503 to complete a request, such as to establish communication with them on behalf of a consumer (such as sending an email notification when requested), or to request interaction with a consumer (such as requesting that a contact center place a call to a consumer's contact number, optionally scheduling a preferred time for interaction or setting other preferences). When a communication system 503 receives this information and any requisite conditions are met (such as a consumer's preferred contact time or an agent is available in a consumer's preferred language), they may establish a two-way communication 520 with a consumer (such as completing a call connection, or placing an outbound call to a consumer's phone).

In this manner, a request may be completed and a consumer may interact with a desired party without ever needing to contact them directly, or even without knowing any of their contact information (such as submitting a request to speak with an agent on behalf of a company, without actually knowing or entering any contact information about that company). Such contact information for participants (i.e., consumer 504 and communication system 503) may be ascertained by an ICS 501 via communication with the systems or entities involved, and may be stored in a database 505 to expedite future operations.

According to some aspects, system 500 may be configured to integrate with an enhanced queue management system (not pictured) for bi-lateral data exchange. An enhanced queue management system may be any suitable hardware or software component such as a software application operating on a computing device such as a server, or may be a software app operating on a consumer's personal device such as a smartphone or any other device suitable for media consumption or communication. According to some embodiments, enhanced queue management system may comprise a plurality of modules configured for analysis, modeling, simulation, and data processing, and may comprise one or more databases. According to some embodiments, enhanced queue management system may be configured to establish and manage one or significantly more than one queue, as well as sequences of queues (e.g., for example at an airport where people generally flow from one queue (check-in, baggage check) to another queue (security line)). The established queues may be associated with both physical events or virtual events. Enhanced queue management system may establish and manage a virtual queue, a physical queue, or both simultaneously. The queue management system may receive a variety of requests related to queue (e.g., request to join a queue, request to leave a queue, request for queue wait time, request to change queues, request to change positions in queue, etc.) and process those request accordingly. Enhanced queue management system may also be configured to send notifications to individuals (or groups) who have submitted a request and/or individuals (or groups) who are currently waiting in a physical queue or in line in a virtual queue. Such notifications may comprise updates about queue status (e.g., current wait time, estimated wait time, number of people in queue, new queue openings, confirming request to join queue, etc.). Notifications may be sent periodically on a set schedule (e.g., every 5 minutes, every 10 minutes, when queue conditions change, etc.).

According to some embodiments, enhanced queue management system may leverage a plurality of information related to queues and use machine learning to construct models which can be used to optimize one or more characteristics associated with the one or more virtual or physical queues being managed by queue management system. For example, information related to queues may include, but is not limited to: sensor data (e.g., cameras used to monitor physical queues, pressure sensors for determining number of people in a physical queue, etc.); GPS data to determine the location of an individual (or group); "Big Data"; mobile device data from queue members; queue theory; queue psychology; $3^{rd}$ party data (e.g., traffic data, weather data, event data, social media data, etc.); intent and/or sentiment; data derived from natural language processing; historical queue data; entity data (e.g., data related to the entity for which a queue is established, for example, a theme park using the enhanced queue management system to manage both physical and virtual queues for the theme park attractions); and various other types of information. According to some embodiments, queue management system may perform a plurality of simulations in order to optimize around one or more queue parameters (e.g., queue throughput, queue wait time, etc.). According to some embodiments, the simulations may be based on the model developed using the machine learning capabilities of queue management system.

According to some aspects, system 500 may integrate with an enhanced queue management system to manage queues that may form when consumers 504 are connected with content providers 502. For example, enhanced queue management system may receive a plurality of callback requests from system 500 or from a consumer device and process the callback requests into the queue associated with the proper content provider 502. For example, the callback request may be directed to a call center which may have a plurality of call center agents, and each agent may have a queue of customers that are waiting to be helped by the call center agent. In this example, the queue management system could optimally place, monitor, and adjust the callback requests within the call center agent queues. In yet another embodiment, queue management system may receive, retrieve, or otherwise obtain real-time consumer context data comprising at least location, activity, and language preference data from the consumer device based on the media content being played, its associated metadata and the current local time on the consumer device and consumer contact and preference data, and use this information to assign callback requestors to a queue for a call center agent most appropriate to process the consumers issue or request.

Figure 7:
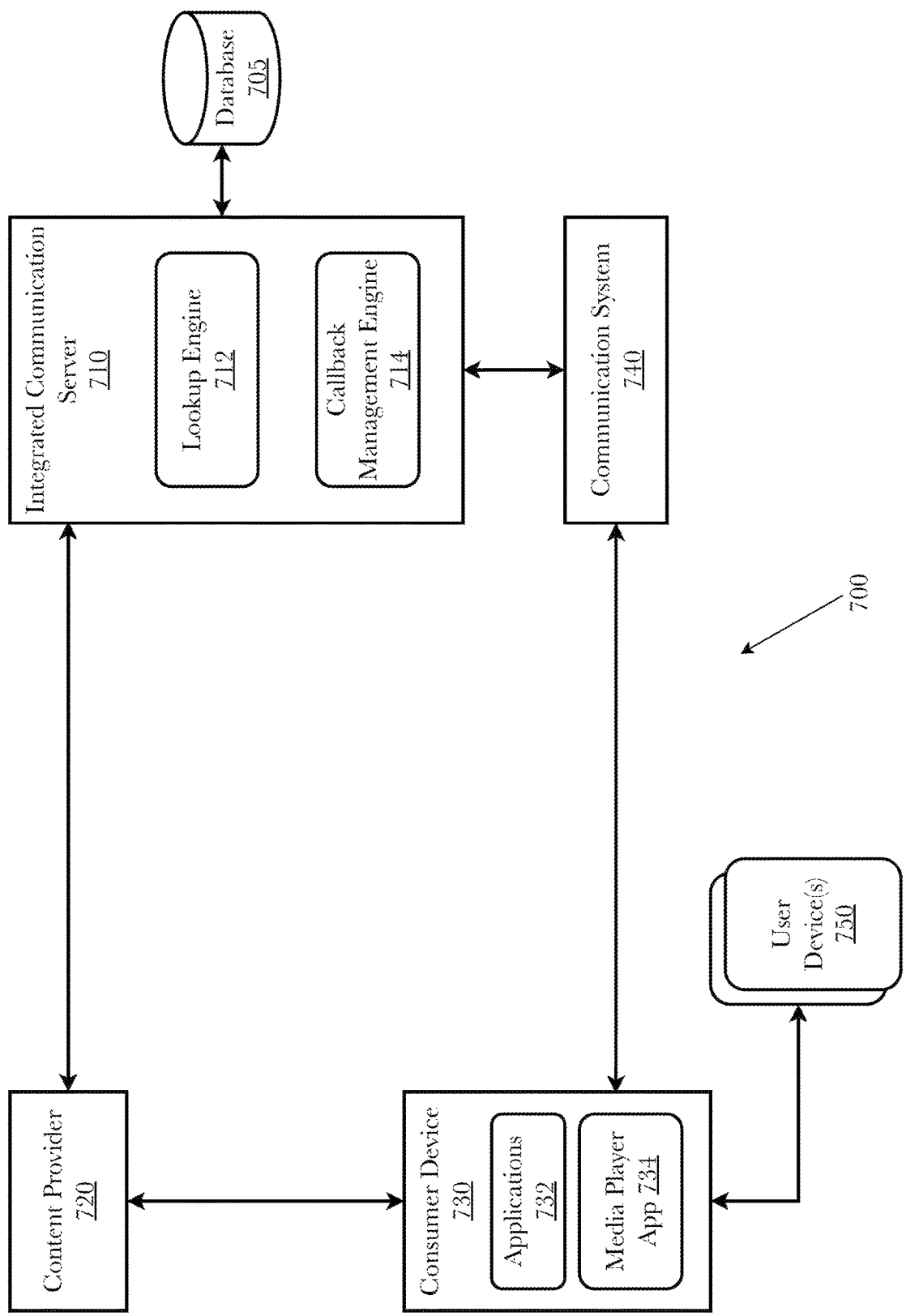
FIG. 7 is a block diagram illustrating an exemplary system architecture for providing automated callback handling during media playback for incoming requests, according to an embodiment.

FIG. 7 is a block diagram illustrating an exemplary system 700 architecture for providing automated callback handling during media playback for incoming requests, according to an embodiment. According to the embodiment, system 700 comprises an integrated communication server 710, one or more content providers 720, a consumer device 730, one or more communication systems 740, and one or more user devices 750. The integrated communication server (ICS) 710, content provider 720, consumer device 730, communication system 740, and database 705 may all be specifically configured versions of, referring to FIG. 5, immediate communication system 501, content provider 502, consumer 504, communication system 503, and database 505, respectively, and may provide the same or similar functionality as previously described.

According to this embodiment, consumer device 730 may comprise a plurality of software applications (app or apps) 732 stored and operating on the device such as (for example) social media apps, messaging apps, phone app, email app, gaming apps, contact list app, calendar and/or schedule app, map or navigation apps, etc. Additionally, a media player app 734 is stored and operating on the consumer device. Media player app 734 can be used for media playback purposes such as to play media content provided by content providers 720. A user (consumer) of consumer device 730 can enter via the app 734 various user preference information associated with a plurality of actions such as, for example, media playback preferences, callback preferences, notification settings, and/or the like. Consumer device 730 may be any suitable computing device capable of storing and executing software and/or machine readable instructions such as, for example, a smart phone, smart wearable, tablet computer, laptop, personal computer, etc.

According to the embodiment, media player app 734 can be configured to assist with automated callback handling during media playback for incoming request by first receiving, retrieving, or otherwise obtaining an incoming request to the consumer device 730 when media content is being played within media player app 734. Incoming requests may include, but are not limited to, incoming calls, incoming texts, incoming notifications, incoming emails, incoming voicemails, and/or the like from other users (which may be contact centers, vendors, etc.). The user of consumer device 730 can configure callback preferences for how to automatically set up a callback he or she is playing media on the consumer device 730. The user may enter these preferences during initial application install as part of the application set-up process or at any time after by accessing user settings within the application and modifying their preferences. In some implementations, the user callback preferences are configured at the consumer device 730, and stored in the cloud at database 705 which is managed by integrated communication server 710.

Callback preferences can be configured by the consumer based on various characteristics. The callback functionality is intended to allow a consumer to be un-interrupted when consuming media content (e.g., video, audio, virtual reality, etc.) on their device, while also providing automated callback handling such that any incoming requests received during media playback are processed based on consumer defined preferences, settings, and/or rules. Callback preferences are similar to "Do Not Disturb" settings on a telephone, but can also be customized based on (for example) the type of communication channel used to send a received incoming request, based on who or what group sent the incoming request, and based on the media content being interacted with. Callback settings can be configured, for example, for playback-based callbacks which can cause ICS 710 to perform callbacks when the consumer is done watching the media content. Callback setting can be configured, for example, for schedule-based callbacks which can cause ICS 710 to perform callbacks at pre-defined times (e.g., default callback time of 10 a.m. the next day). Callback settings can be configured, for example, to delay notifications, such that all missed calls, text, emails, etc. are shown to the consumer after the media content has been consumed. Callback preferences may be based on the type of media being consumed and can be customized to a specific media application. For example, a consumer's callback preferences while listening to a podcast on an music streaming application may be different than the callback preferences defined while consuming a movie streaming application. The provided callback preferences are exemplary only and are non-limiting in their description.

In operation a consumer is interacting with media content on consumer device 730 when an incoming request is obtained. Media player app 734 intercepts or otherwise obtains the incoming message from another user device 750 and prevents it from interfering with the media playback (for example, by stopping the generation and display of a notification pop-up indicating a received incoming request). Information about the consumer (e.g., device 730 identifier information such as telephone number, MAC address, IMEI number; application data and/or metadata; location data, etc.) and information associated with the incoming request (e.g., telephone number, location, user name or contact data, communication channel, etc.) may be retrieved, received, or otherwise obtained and sent to ICS 710.

According to the embodiment, ICS 710 is present and configured to receive connections, data, and callback requests from consumer device 730. ICS 710 also communicates with and exchanges data with content providers 720, communication system 740, and other user devices 750. In some implementations, ICS 710 comprises a lookup engine 712 and a callback management engine 714. Lookup engine 712 can be configured to receive consumer information, use the consumer information to lookup the consumer profile in database 705 and retrieve the consumer callback preferences stored in the consumer profile, and then send the retrieved consumer preferences to callback management engine 714. Lookup engine 712 can also perform profile modification of user preferences and settings. At consumer device 730 a consumer can define new preferences and modify existing ones by interacting with interactive elements displayed on a graphic user interface of consumer device 730. The interactions conducted by the consumer on the consumer device 730 can be captured and sent to ICS 710 which is received by lookup engine 712 and used to create or modify existing consumer profiles stored in database 705.

Callback management engine 714 can be configured to automatically schedule callback between the user of the consumer device 730 and the individual or entity associated with the received incoming request based at least on the consumer's callback preferences. Callback management engine 714 may create a callback object which can be used to store information related to two or more parties involved in the callback (e.g., consumer and vendor), scheduling data for when to execute the callback, any available context data related to the callback (e.g., metadata associated with the media content being played, location data, time/date data, environmental data, intent/sentiment data, etc.). In some implementations, user callback preferences and settings may be stored in the callback object in the cloud based database 705.

Detailed Description of Exemplary Embodiments

Figure 6:
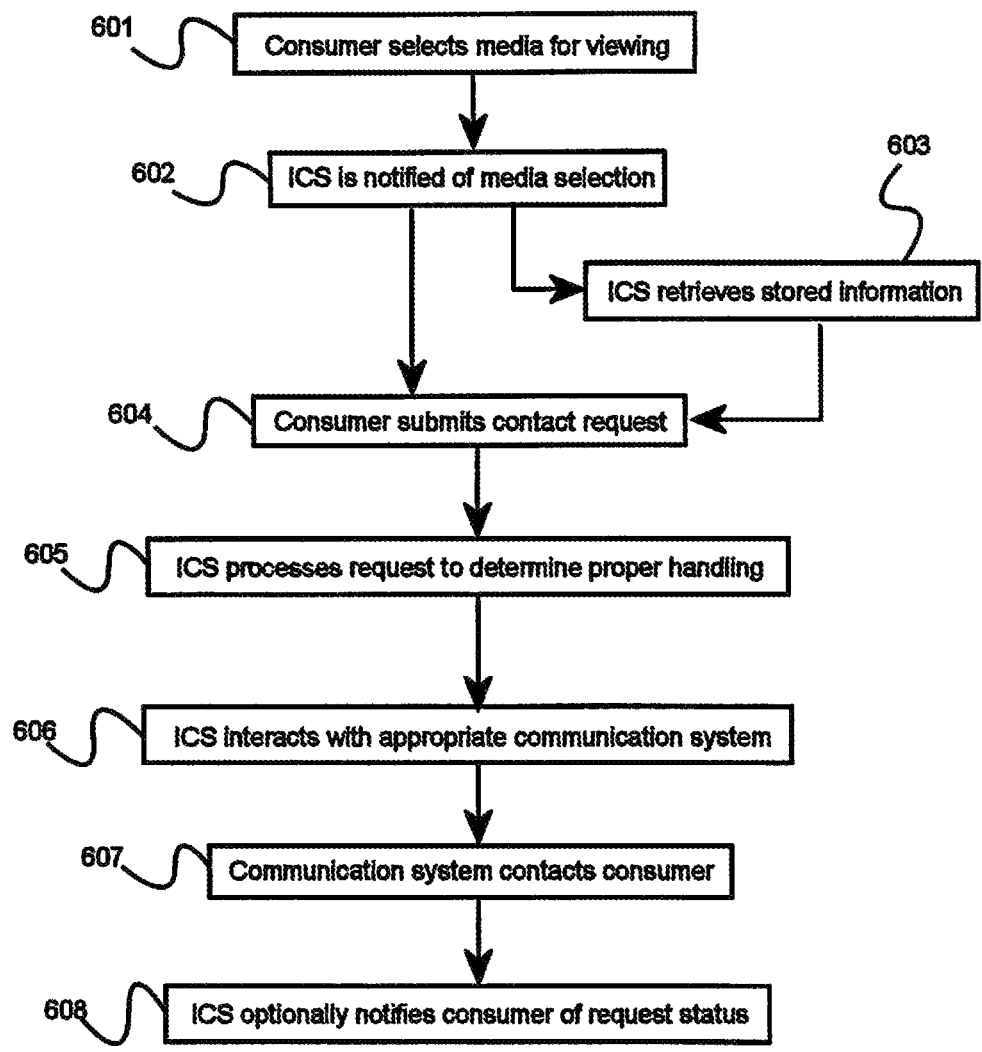
FIG. 6 is a method flow diagram illustrating an exemplary method for providing consumer contact integrated with media broadcasts, according to a preferred embodiment of the invention.

FIG. 6 is a method flow diagram illustrating an exemplary method 600 for integrated consumer contact, according to a preferred embodiment of the invention. As illustrated, in an initial step 601 a consumer may select content for viewing, such as listening to an audio broadcast or watching a video. In a next step 602, an ICS may be notified of the content selected (and optionally any additional relevant information such as a user's device information or location, such as for determining language preference or local time) by a content provider, and in a sub-step 603 an ICS may then retrieve any known information that may be relevant, such as previously-established consumer information (such as language, location, preferred time or methods of contacts, or any other such information relevant to a particular consumer), or known information regarding communication systems or other information relevant to the particular media being viewed, such as contact centers operated by a company providing an advertisement, or an email address associated with an internet user that uploaded content being viewed. In a next step 604 a consumer may submit a contact request, such as by selecting an interactive interface element that submits a request, and if needed additional information (such as contact preferences or device information) may be retrieved and submitted along with a request (for example, a user may manually select or input such information such as by filling out a form or answering prompts during request submission, or it may be retrieved automatically, such as by reading a user's language and time preferences from a smartphone used to submit a contact request). In a next step 605, an ICS may process this information to determine how to handle a contact request, such as choosing to engage a contact center if a consumer is operating a smartphone, or to schedule a future contact attempt if a request is submitted outside of operating hours, or any other such determination according to information received. In a next step 606, an ICS may communicate with a communication system appropriate to the particular request being handled, such as establishing a connection with a contact center and providing a consumer's request information to facilitate the contact center's handling of a call with the consumer (for example, information that might traditionally be obtained by prompting a consumer to make selections via an IVR when calling). In a next step 607, a communication system may complete an interaction such as by communicating directly with a consumer, or by acknowledging a request such that an ICS may then connect the consumer (such as, for example, if a consumer submitted a request for a call via a smartphone app, and subsequently waited on their phone for the request to be handled and the call to be answered by a contact center agent). In an optional final step 608, an ICS may optionally return a notification to a media provider for presentation to a consumer, such as to confirm a request was successfully submitted, or to provide any relevant details such as the time of a scheduled contact.

In this manner, it can be appreciated that a variety of potential interaction types may be possible according to the invention, and may accommodate a wide variety of consumer needs, devices, communication means, and media types. For example, during viewing of a television advertisement a consumer might be prompted to press a button on their remote control to request a call from a company regarding the product or service being advertised. Upon submitting this request, the consumer's television provider might provide their phone number (as may have been used to establish their television service) to an ICS, which may then provide this information to a contact center for handling by an agent. An appropriately-skilled contact center agent (such as trained in the operation of the product in the advertisement) may then receive this request, and place a call to the consumer's telephone number, completing the interaction.

Another example might be an individual listening to a streaming audio service on their smartphone, such as via PANDORA™ or other streaming audio service provider.

The consumer might hear an advertisement between songs, and press a button on their streaming app to submit a request for more information regarding a product or service that was advertised. The request may be automatically populated with additional information that may be obtained from the consumer's device, such as their location, language preference, various contact information such as email address, alternate phone numbers, or even a physical address (any combination of which may be stored within a smartphone or similar mobile communications device common in the art). The request may then be submitted to a known communication system for the company in the advertisement, such as an email address placed on file specifically for handling requests made through their PANDORA™ ads. The company may then, upon receipt of the request and review of the information contained, choose to send a product catalog to the consumer's physical address that was obtained from their device, as well as schedule a follow-up phone call an appropriate amount of time in the future to discuss the products with the consumer after they have had an opportunity to review the catalog sent.

In this manner, it can be appreciated that the invention may be readily adapted to any combination of media, consumer preference, or physical device used by the consumer, and furthermore that existing devices and services may utilize the functionality of the invention with little to no alteration—for example, PANDORA™ streaming audio broadcasts may already contain a variety of metadata such as artist information for songs being played, and information relevant to the operation of the invention (such as contact information for companies being advertised) may be included by populating fields already present but unused. In this manner, existing services, devices, and standards may be easily integrated to provide the functions of the invention, and integration may take place without any disruption of consumer experience. Furthermore, integration may be seen as optional—some companies may choose to offer the functionality of the invention, while others may choose not to, and both may offer their advertisements interchangeably via similar media providers and to similar consumers and devices, allowing for gradual or "piecemeal" adoption, rather than forcing integration and potentially causing issues such as (for example) companies withdrawing from particular media providers due to a desire to avoid the costs of integration.

Figure 8:
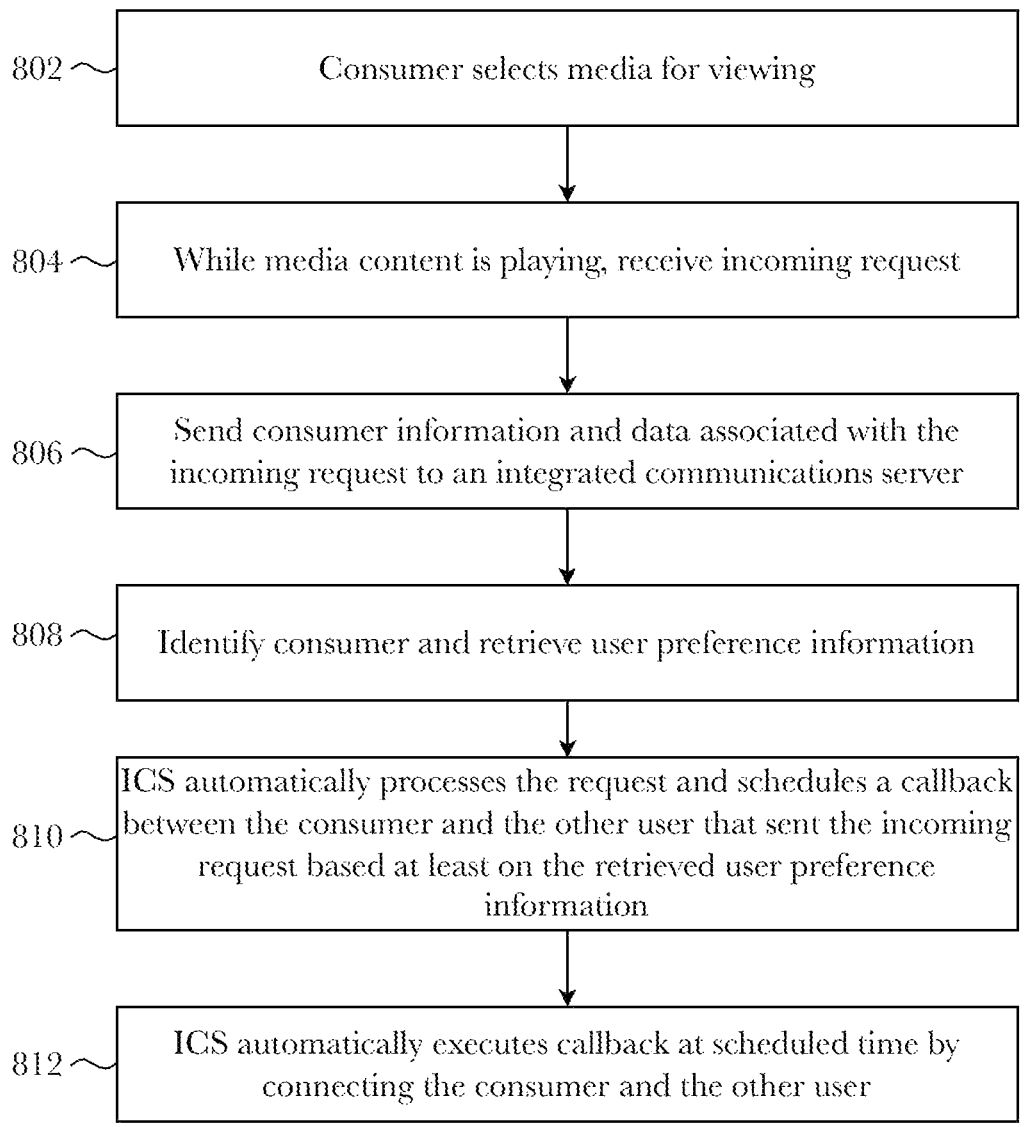
FIG. 8 is a flow diagram illustrating an exemplary method for automated callback handling during media playback on a consumer device, according to an embodiment.

FIG. 8 is a flow diagram illustrating an exemplary method for automated callback handling during media playback on a consumer device, according to an embodiment. According to the embodiment, the process begins at 802 when a consumer selects some media content for viewing such as through media player app 734. At 804 while the media content is playing, the consumer device 730 receives an incoming request. The incoming request may be an incoming call, text, email, voicemail, and/or the like sent from another user (which may be a contact center, vendor, content provider, etc.). Media player app 734 may intercept or otherwise obtain the incoming request and then retrieve information related to both the user of consumer device 730 and other user who sent the incoming request. The retrieved consumer and other user information may be sent to ICS 710 at 806. ICS 710 can use some of the received consumer data to identify a consumer profile stored in database 705 that matches the user of consumer device 710 and then retrieve user preference data from the matched consumer profile at 808. Consumer data that can be used to match and identify a consumer profile can include a unique identifier associated with consumer device 730 such as, for example, a telephone number, a MAC address, a IMEI number, etc., or any other unique information that can be used to link a consumer device 730 with a consumer profile stored in database 705.

At 810 ICS 710 processes the intercepted request and schedules a callback between the consumer and the other user based at least on the retrieved consumer callback preferences. Callback preferences may be schedule-based, playback-based, specific to an individual or group, specific to the type of media content being played, specific to the type of communication channel which was used to transmit the incoming request, and/or the like. ICS 710 may create a callback object which can store all the relevant data necessary to automatically execute the callback at the scheduled time. The callback object may be stored in database 705. At 812 the ICS 710 automatically executes the callback at the scheduled time by connecting the consumer and the other user via a communication network and/or communication system 740. ICS 710 can facilitate the telephone call to the consumer device and the to the second user by establishing a two-way voice connection between the user of the consumer device and the second user. In this way, a method is provided for automatic callback handling during media playback on a consumer device.

The skilled person will be aware of a range of possible modifications of the various embodiments described above. Accordingly, the present invention is defined by the claims and their equivalents.

What is claimed is:

1. A system for integrated consumer interaction with automated callback handling during media playback, comprising:
   a media player application installed on a consumer device, the media player application comprising a first plurality of programming instruction stored in a memory of, and operating on a processor of, the consumer device, wherein the first plurality of programming instructions, when operating on the processor of the consumer device, cause the consumer device to:
       request, receive, and store contact and preference information from a user;
       receive media content from a content provider;
       play the media content on the consumer device;
       while the media content is playing, display an interactive interface element within a graphical user interface operating on the user's consumer device; and
       upon receipt of a user command via the interactive interface element:
           automatically retrieve real-time consumer context data comprising at least location, activity, and language preference data from the consumer device based on the media content being played, its associated metadata and the current local time on the consumer device;
           automatically generate an electronic callback; and
           automatically send the callback request to an integrated communications server; and
   the integrated communication server comprising a memory, a processor, and a second plurality of programmable instructions stored in the memory of, and operating on the processor of, the integrated communication server, wherein the second plurality of programming instructions, when operating on the processor of the integrated communication server, cause the integrated communication server to:

receive the company contact information, the media content identification, and the user's contact and preference information;
receive a callback request from the consumer device;
automatically schedule a callback to the user of the consumer device based at least on the metadata specific to media content being played on the user device and on the received contact and preference information; and
when scheduled, automatically place a telephone call to the consumer device and to a call center agent appropriately skilled to handle the specific callback request.

2. The system of claim 1, wherein the media player application is further configured to:
while the media content is playing:
receive an incoming request from a second user, wherein the incoming request is an incoming call, text, email, or voicemail;
retrieve consumer information and information associated with incoming request; and
send the consumer information and the information associated with the incoming request to the integrated communication server.

3. The system of claim 2, wherein the integrated communication server is further configured to:
receive the consumer information and the information associated with the incoming request;
use the consumer information to identify a consumer profile in a database, wherein the consumer information comprises a unique identifier which is used to match against a stored unique identifier in the consumer profile;
retrieve consumer callback preference information from the identified consumer profile;
automatically schedule a callback between the user of the consumer device and the second user based at least on the consumer callback preference information; and
when scheduled, automatically place a telephone call to the consumer device and to the second user.

4. The system of claim 3, wherein the consumer callback preference information further comprises configuration settings for handling incoming requests while the media content is being played.

5. The system of claim 3, wherein the telephone call to the consumer device and the to the second user establishes a two-way voice connection between the user of the consumer device and the second user.

6. The system of claim 3, wherein the consumer callback preference information is stored in a data storage operating as a component of the integrated communication server.

7. The system of claim 4, wherein the configuration settings comprise user-specific preferences, group-based preferences, playback-based preferences, schedule-based preferences, group based preferences, media-based preferences, and communication channel specific preferences.

8. The system of claim 1, wherein the telephone call to the consumer device and to a call center agent establishes a two-way voice connection between the user of the consumer device and a selected call center agent.

9. A method for integrated consumer interaction with automated callback handling during media playback, comprising the steps of:
configuring a media player application to perform the following steps when installed on a consumer device:
requesting, receiving, and storing contact and preference information from a user;
receiving media content from a content provider;
playing the media content on the consumer device;
while the media content is playing, displaying an interactive interface element within a graphical user interface operating on the user's consumer device;
upon receipt of a user command via the interactive interface element:
automatically retrieving real-time consumer context data comprising at least location, activity, and language preference data from the consumer device based on the media content being played, its associated metadata and the current local time on the consumer device;
automatically generating an electronic callback; and
automatically sending the callback request to an integrated communication server comprising a memory, a processor, and a plurality of programming instructions stored in the memory and operating on the processor;
using the integrated communication server to perform the following steps:
receiving the company contact information, the media content identification, and the user's contact and preference information;
receiving a callback request from the consumer device;
automatically scheduling a callback to the user of the consumer device based at least on the metadata specific to media content being played on the user device and on the received contact and preference information; and
when scheduled, automatically placing a telephone call to the consumer device and to a call center agent appropriately skilled to handle the specific callback request.

10. The method of claim 9, wherein the media player application is further configured to perform the steps of:
while the media content is playing:
receiving an incoming request from a second user, wherein the incoming request is an incoming call, text, email, or voicemail;
retrieving consumer information and information associated with incoming request; and
sending the consumer information and the information associated with the incoming request to the integrated communication server.

11. The method of claim 10, wherein the integrated communication server is further configured to: perform the steps of:
receiving the consumer information and the information associated with the incoming request;
using the consumer information to identify a consumer profile in a database, wherein the consumer information comprises a unique identifier which is used to match against a stored unique identifier in the consumer profile;
retrieving consumer callback preference information from the identified consumer profile;
automatically scheduling a callback between the user of the consumer device and the second user based at least on the consumer callback preference information; and
when scheduled, automatically placing a telephone call to the consumer device and to the second user.

12. The method of claim 11, wherein the consumer callback preference information further comprises configuration settings for handling incoming requests while the media content is being played.

13. The method of claim 11, wherein the telephone call to the consumer device and the to the second user establishes a two-way voice connection between the user of the consumer device and the second user.

14. The method of claim 11, wherein the consumer callback preference information is stored in a data storage operating as a component of the integrated communication server.

15. The method of claim 12, wherein the configuration settings comprise user-specific preferences, group-based preferences, playback-based preferences, schedule-based preferences, group based preferences, media-based preferences, and communication channel specific preferences.

16. The method of claim 9, wherein the telephone call to the consumer device and to a call center agent establishes a two-way voice connection between the user of the consumer device and a selected call center agent.

\* \* \* \* \*